US008502687B2

(12) United States Patent
Wang et al.

(10) Patent No.: US 8,502,687 B2
(45) Date of Patent: Aug. 6, 2013

(54) SERVER AND METHOD FOR DETECTING A PIPELINE

(75) Inventors: Chi-Chih Wang, Taipei Hsien (TW); Bing-Yu He, Shenzhen (CN); Zhong-Gen Zhan, Shenzhen (CN); Shi-Yi Yang, Shenzhen (CN)

(73) Assignees: GDS Software (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 394 days.

(21) Appl. No.: 12/909,855

(22) Filed: Oct. 22, 2010

(65) Prior Publication Data

US 2011/0181425 A1 Jul. 28, 2011

(51) Int. Cl.
*G08B 21/00* (2006.01)
*H04Q 9/00* (2006.01)

(52) U.S. Cl.
USPC ...... 340/605; 340/606; 340/611; 340/870.07; 340/870.11

(58) Field of Classification Search
USPC ................. 340/604, 605, 606, 611, 626, 627, 340/686.1, 686.4, 870.07, 870.11; 701/450; 702/183, 187, 188; 709/227; 324/71.2, 539, 324/544; 73/861.23
See application file for complete search history.

(56) References Cited

U.S. PATENT DOCUMENTS

| | | | | |
|---|---|---|---|---|
| 5,983,004 | A * | 11/1999 | Shaw et al. | 709/227 |
| 6,778,100 | B2 * | 8/2004 | Schempf | 340/870.07 |
| 6,965,320 | B1 * | 11/2005 | Casey et al. | 340/870.07 |
| 7,096,225 | B2 * | 8/2006 | Otsuki et al. | 701/450 |
| 7,356,444 | B2 * | 4/2008 | Blemel | 702/183 |

FOREIGN PATENT DOCUMENTS

CN 101255950 A 9/2008

* cited by examiner

*Primary Examiner* — Van T. Trieu
(74) *Attorney, Agent, or Firm* — Altis Law Group, Inc.

(57) ABSTRACT

A server and method detects a pipeline. The server reads pipeline data from a data collector and analyzes the pipeline data to determine if the pipeline works abnormally. An alert command is sent by the server to an alarm computer to notify a user in response to a determination that the pipeline works abnormally. The server saves the pipeline data into a database system.

12 Claims, 4 Drawing Sheets

SERVER AND METHOD FOR DETECTING A PIPELINE

BACKGROUND

1. Technical Field

Embodiments of the present disclosure relate to detection technology, and particularly to a server and method for detecting a pipeline.

2. Description of Related Art

With the increasing utilization of pipelines as a medium for transporting fluid (e.g., gas), all kinds of accidents may happen to the pipelines, such as a gas leak. The accidents may cause a serious waste of resources and safety problems. Currently, pipeline detection depends on manual operation. For example, an engineer may walk along a pipeline to inspect the pipeline. However, the method may be time consuming or imprecise.

DETAILED DESCRIPTION

All of the processes described below may be embodied in, and fully automated via, function modules executed by one or more general purpose processors of a computer. Some or all of the methods may alternatively be embodied in specialized hardware. The function modules may be stored in any type of computer-readable medium or other computer storage device.

As used herein, the term, "pipeline data" may be defined as data generated by a pipeline. Likewise, the term, "sensor" may be defined as a device for acquiring the pipeline data from the pipeline. It may be understood that the term, "data" may refer to a single data item or may refer to a plurality of data items. These terms, with reference to FIGS. 1-3, will be described in greater detail below.

Figure 1:
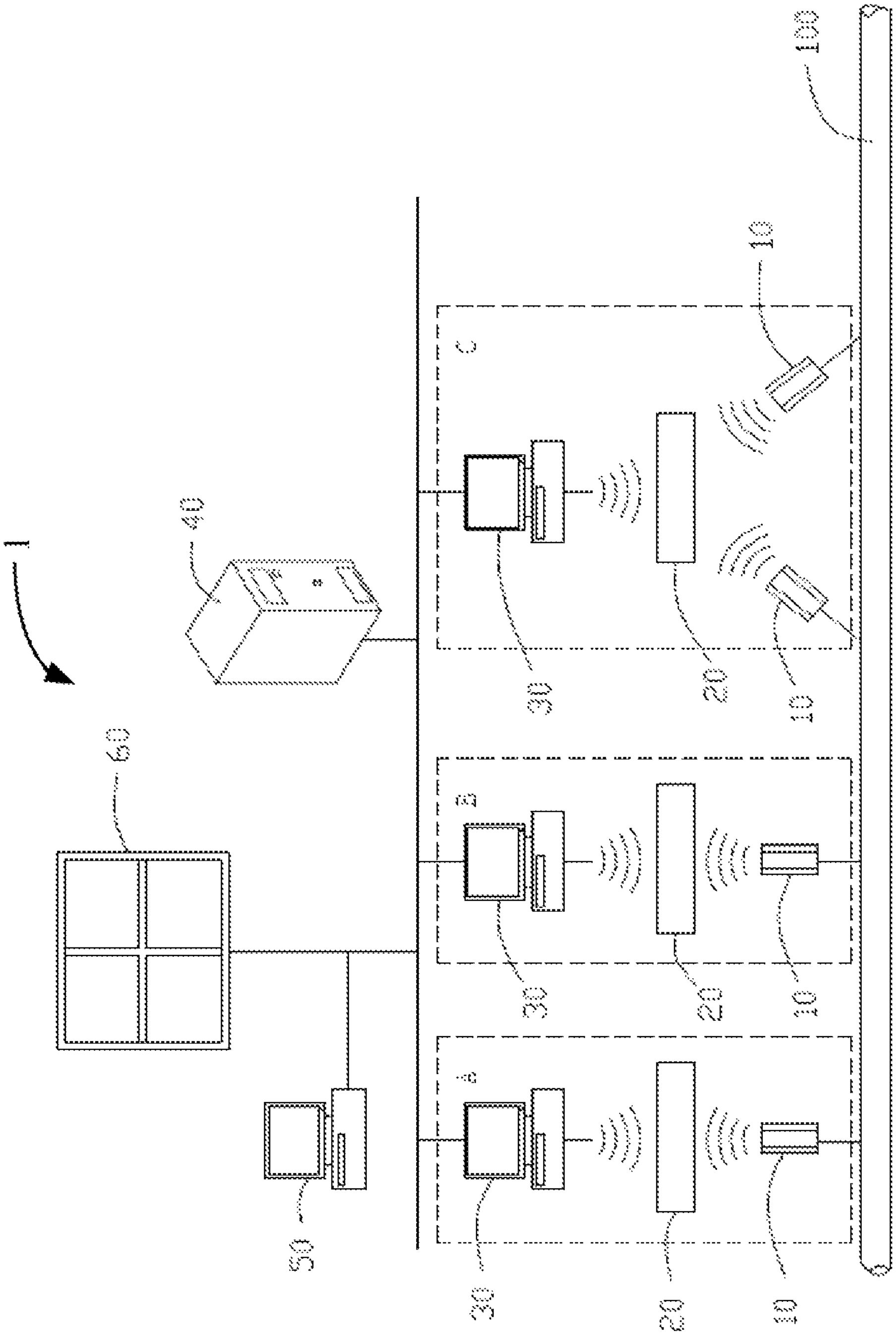
FIG. 1 is a systematic diagram of one embodiment of a pipeline detection system.

FIG. 1 is a systematic diagram of one embodiment of a pipeline detection system 1. The pipeline detection system 1 includes one or more sensors 10, one or more data collectors 20, one or more servers 30, a database system 40, an alarm computer 50, a display device 60 and a pipeline 100. The pipeline detection system 1 may automatically detect if the pipeline 100 works abnormally according to the pipeline data and stores the pipeline data into the database system 40.

The pipeline 100 passes through different areas, as shown in FIG. 1, an area A, an area B and an area C. Each area includes one or more sensors 10, a data collector 20, and a server 30. In one embodiment, the pipeline 100 is used to transport fluid such as oil, gas, or water. The pipeline 100 includes at least one sensor 10 to acquire pipeline data of the pipeline 100 (e.g., fluid temperatures, flow rates and fluid pressures). The sensors 10 may be, but are not limited to, an infrared sensor, a data acquiring sensor, a microwave sensor, a flow meter or a pressure sensor. In one embodiment, the sensors 10 may be installed at different positions of the pipeline 100. Each of the sensors 10 may include a communication unit such as a radio transceiver, for communicating with the data collector 20.

The data collector 20 is connected to the one or more sensors 10 by a wireless connection (e.g., Wireless LAN), so as to collect the pipeline data from the one or more sensors 10. The data collector 20 is also connected to the server 30 to send the collected pipeline data to the server 30.

The server 30 is electronically connected to the database system 40 using database connectivity, such as open database connectivity (ODBC) or java database connectivity (JDBC). In one embodiment, the server 30 may be a data processing device or a computing device such as a personal computer, an application server, or a workstation, for example. The database system 40 may store the pipeline data as mentioned above.

The server 30 is further electronically connected to an alarm computer 50 for notifying a user if the pipeline 100 works abnormally. Further details of the server 30 will be described below.

The alarm computer 50 is electronically connected to a display device 60 (e.g., a video wall) for notifying the user if the pipeline 100 works abnormally. Depending on the embodiment, the alarm computer 50 may be further connected to an alarm device (e.g., a buzzer and/or a warning light) for notifying the user. The alarm computer 50 may be a data processing device or a computing device such as a personal computer, an application server, or a workstation, for example.

Figure 2:
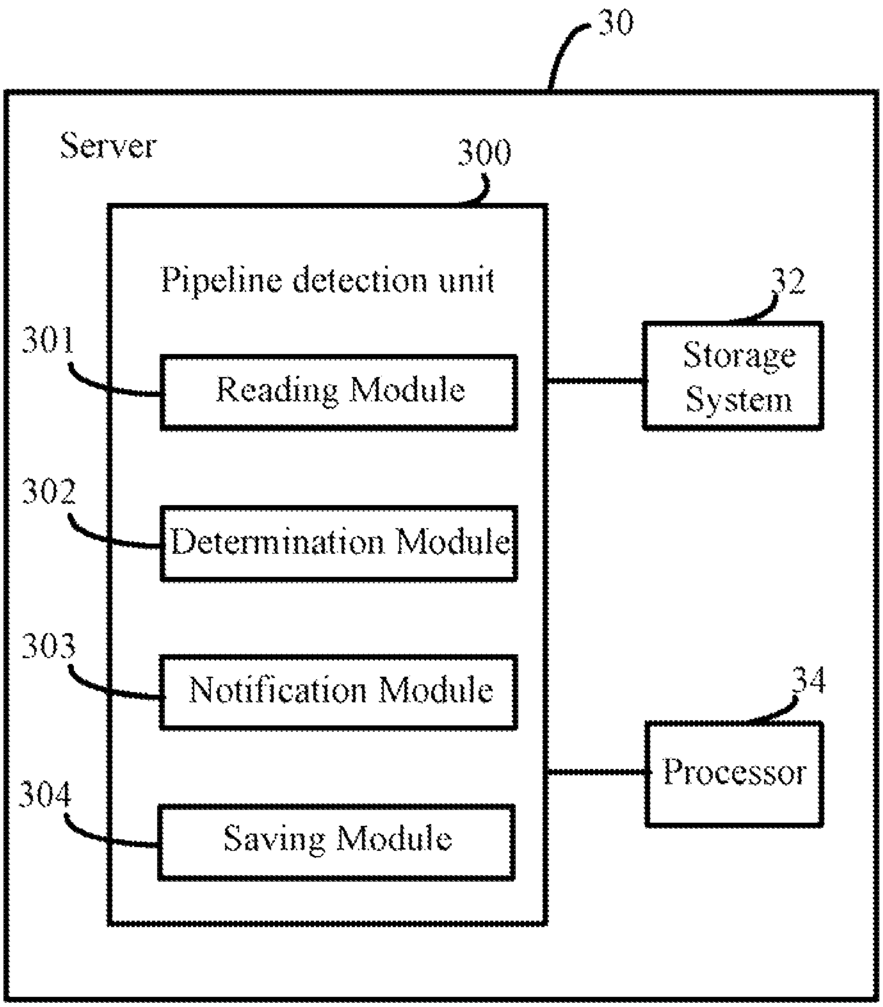
FIG. 2 is a block diagram of one embodiment of a server of the pipeline detection system in FIG. 1.

FIG. 2 is a block diagram of one embodiment of the server 30 including a pipeline detection unit 300. The pipeline detection unit 300 automatically collects the pipeline data and processes the pipeline data. In one embodiment, the data collection unit 300 includes a reading module 301, a determination module 302, a notification module 303, and a saving module 304. One or more computerized codes of the modules 301-304 are stored in a storage system 32 of the server 30. One or more general purpose or specialized processors, such as a processor 34, executes the computerized codes of the modules 301-304 to provide one or more operations of the data collection unit 300.

The reading module 301 reads the pipeline data from the data collector 20. In one embodiment, the pipeline data includes fluid temperatures, flow rates and fluid pressures. In addition, the reading module 301 reads the pipeline data from the data collector 20 at a time interval at which pipeline data are collected. In one example, the reading module 301 reads the pipeline data from the data collector 20 every 5 minutes.

Figure 4:
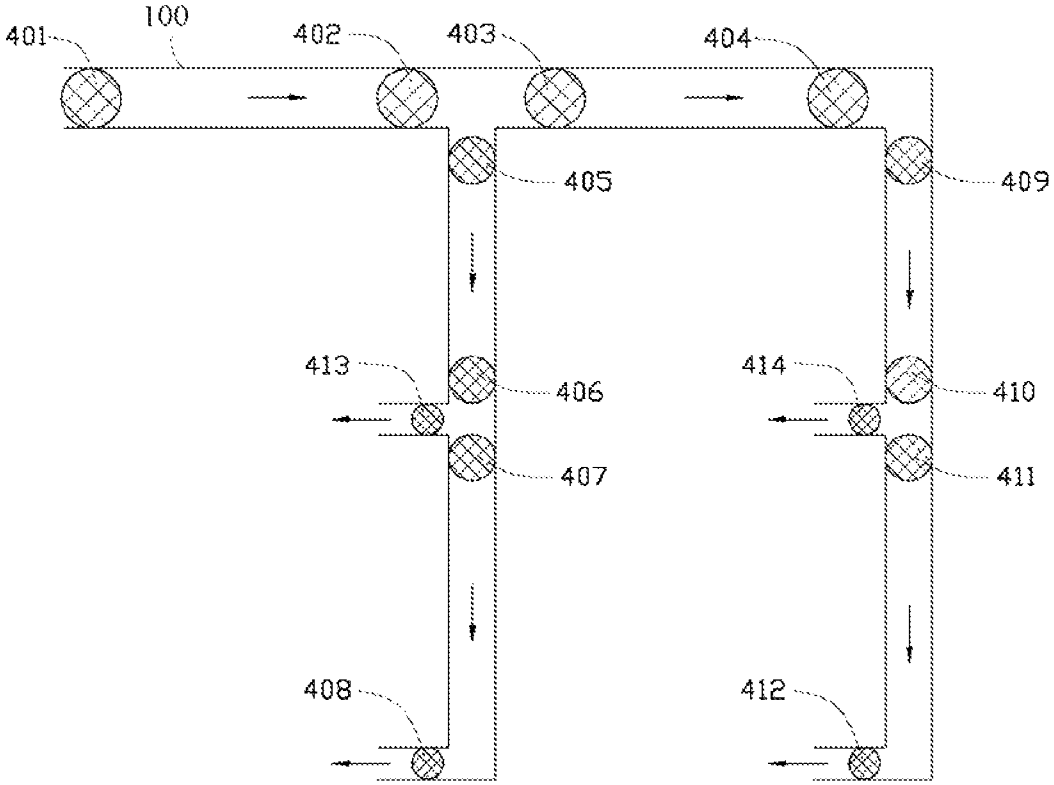
FIG. 4 illustrates one example of sensors installed in the pipeline in FIG. 1.

FIG. 4 illustrates one example of sensors 401-414 installed in the pipeline 100. The sensors 401-414 collect the pipeline data, such as, fluid temperatures, flow rates and fluid pressures.

The determination module 302 analyzes the pipeline data to determine if the pipeline 100 works abnormally. The determination module 302 determines the pipeline 100 works normally upon the condition that the fluid temperatures falls out of an allowable range or the leaks occur to the pipeline 100. In one embodiment, the determination module 302 may analyze the fluid temperatures to determine if the fluid temperatures fall in an allowable range. The determination module 302 determinates leaks occur to the pipeline 100. In one embodiment, the determination module 302 may analyze the flow rates to determine if leaks occur and identify leak sections of the pipeline 100. In addition, the determination module 302 analyzes the fluid pressures to identify the leak positions in the leak sections. A pipeline section may be known as a part of the pipeline 100, such as a pipeline section between the sensors 401 and 402. Further details will be described below.

The notification module 303 sends an alert command to the alarm computer 50 to notify a user in response to a determination that the pipeline 10 works abnormally. In one embodiment, if the pipeline 100 works abnormally, the fluid temperatures fall out of the allowable range or leaks occur to the pipeline 100. In one embodiment, the alarm computer 50 sends an alert notification to the user. For example, the alarm computer 50 sends an e-mail or a short message service (SMS) message to notify the user that the pipeline 100 works abnormally. In addition, the alarm computer 50 may display the notification shown in the display device 60 if the alarm computer 50 receives the alert command.

The saving module 304 saves the pipeline data into the database system 40. In one embodiment, the saving module 304 saves the fluid temperature, flow rates and fluid pressures into the database system 40.

Figure 3:
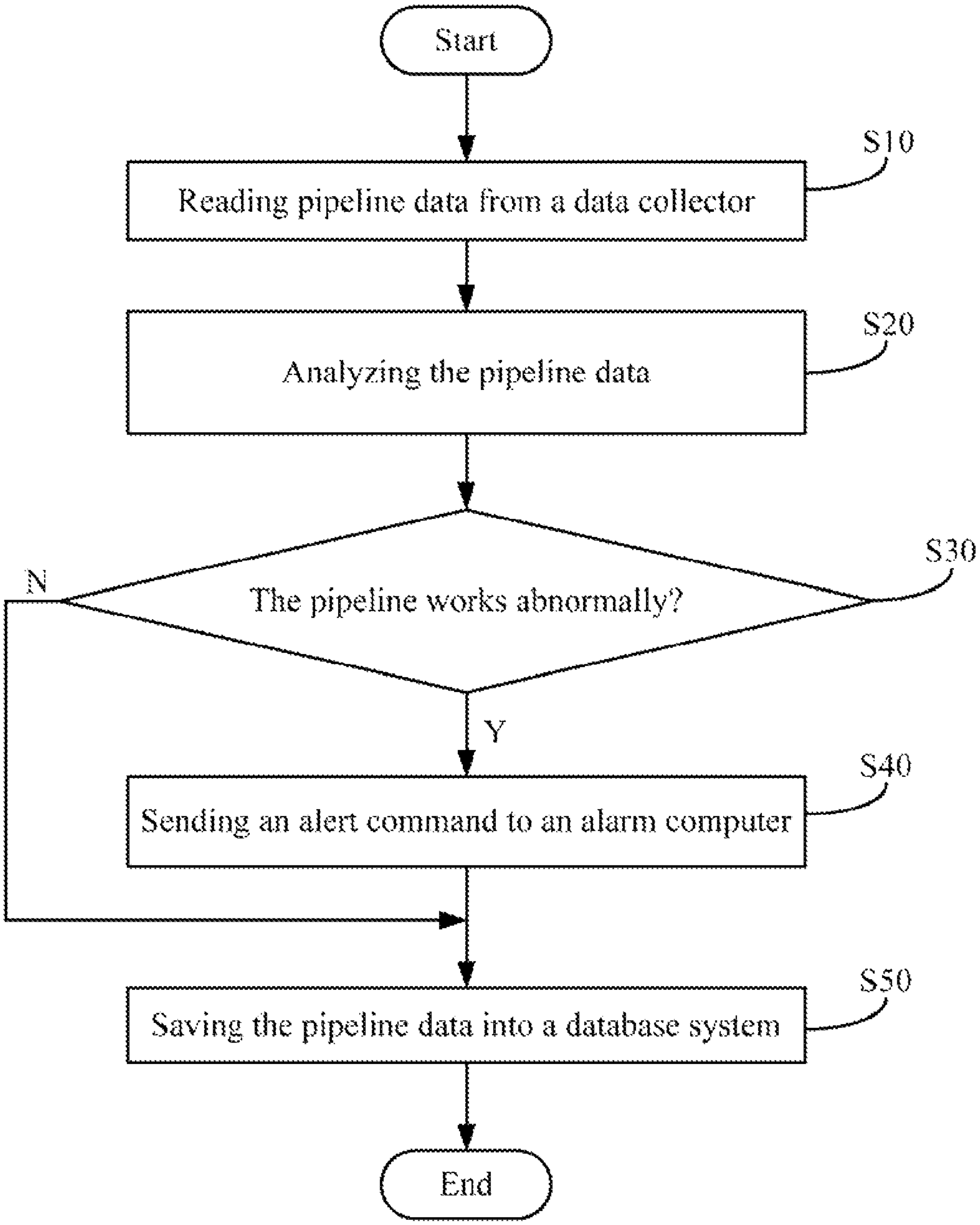
FIG. 3 is a flowchart of one embodiment of a method for detecting a pipeline.

FIG. 3 is a flowchart of one embodiment of a method for detecting the pipeline 100. The method may be used to detect if the pipeline 100 works abnormally. Depending on the embodiment, additional blocks may be added, others deleted, and the ordering of the blocks may be changed.

In block S10, the reading module 301 reads the pipeline data from the data collector 20. In one embodiment, the pipeline data includes fluid temperatures, flow rates and fluid pressures. In addition, the reading module 301 reads the pipeline data from the data collector 20 at a time interval at which pipeline data of the pipeline 100 are collected. In one example, the reading module 301 reads the pipeline data from the data collector 20 every 5 minutes.

In one example with respect to FIG. 4, the sensors 401-414 are installed in the pipeline 100 at different locations. Each of the sensors 401-414 measures a fluid temperature, a flow rate and a fluid pressure in the pipeline 100. For example, the sensor 401 obtains a fluid temperature T1, a flow rate of Q1 and a fluid pressure of P1. The sensor 414 obtains a fluid temperature T14, a flow rate of Q14 and a fluid pressure of P14.

In block S20, the determination module 302 analyzes the pipeline data. In one embodiment, the determination module 302 may analyze the fluid temperature of the pipeline data to determine if fluid temperatures fall in an allowable range. For example, the allowable range of location of the sensor 401 is [6.5° C.~7.0° C.]. If the T1 falls in [6.5° C.~7.0° C.], the T1 is allowable. In one embodiment, the determination module 302 analyzes the flow rates in the pipeline 100 to determine if the leaks occur and indentify the leak sections of the pipeline 100. In one example with respect to FIG. 4, if no leaks occur in the pipeline 100, the flow rates Q1-Q14 satisfy equations: Q1=Q2, Q3=Q4=Q9=Q10, Q5=Q6, Q7=Q8, Q11=Q12, Q1=Q3+Q5, Q5=Q7+Q13, and Q9=Q11+Q14. If any of the equations are not satisfied, leak sections of the pipeline 100 are identified. For example, if Q1≠Q2, a pipeline section between sensors 401 and 402 is determined being a leak section. In one embodiment, the determination module 302 analyzes the fluid pressures in the pipeline 100 to determine the leak positions in the leak sections. The determination module 302 may identify negative pressure waves generated in the leak sections according to the fluid pressures. In addition, the determination module 302 determines the leak positions in the leak sections according to the identified negative pressure waves. In one embodiment, one example of a formula to determine a leak location of a leak point in a leak section may be: $x=(L-a\Delta t)$ 12. In the formula, L is the length of the leak section, x is a distance between a start point of the leak section and the leak point, a is a propagation velocity of the negative pressure wave in the leak section, $\Delta t$ is a time difference of receiving the negative pressure wave between the start point and an end point of the leak section.

In block S30, the determination module 302 determines if the pipeline 100 works abnormally. The procedure goes to block S40 if the pipeline 100 works abnormally. The procedure goes to block S50 if the pipeline 100 works normally.

In block S40, the notification module 303 sends an alert command to the alarm computer 50 to notify a user. In one embodiment, the alarm computer 50 sends the alert notification so that the user may be aware of problems quickly and easily. The alert notification may be an e-mail or a short message service (SMS) message. The e-mail or the SMS message may include information "Error: the pipeline has a leak occurring; leak location: xxx; time: yyyy-mm-dd; reason: zzz" in one example. In addition, the alarm computer 50 may display the notification shown in the display device 60 if the alarm computer 50 receives the alert command.

In block S50, the saving module 304 saves the pipeline data into the database system 40. In one embodiment, the user may set a scheduled time for starting a program for saving the pipeline data into the database system 40. For example, the user may set the time for starting the program at 9:00 A.M. If the current time is 9:00 A.M., the program for saving the pipeline data is executed.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A server, comprising:

a storage system;

at least one processor; and a pipeline detection unit stored in the storage system and being executable by the at least one processor, the pipeline detection unit comprising:

a reading module operable to read pipeline data from a data collector, wherein the pipeline data comprises fluid temperatures, flow rates and fluid pressures;

a determination module operable to analyze the pipeline data to determine if a pipeline works abnormally;

the determination module operable to analyze the fluid temperatures to determine the fluid temperatures fall in an allowable range, analyzes the flow rates to determine leak sections of the pipeline;

the determination module operable to analyze the fluid pressures of the leak sections to determine the leak positions in the leak sections;

the determination module operable to identify negative pressure waves generated in the leak sections according to the fluid pressures of the leak sections, and determine the leak positions in the leak sections according to the identified negative pressure waves;

a notification module operable to send an alert command to an alarm computer connected to the server to notify a user in response to a determination that the pipeline works abnormally, wherein the alarm computer sends an alert notification to the user; and a saving module operable to save the pipeline data into a database system.

2. The system of claim 1, wherein the pipeline data is acquired by sensors which is installed at different locations of a pipeline, and is collected by the data collector from the sensors.

3. The system of claim 1, wherein the determination module determines the pipeline works abnormally upon the condition that the fluid temperatures fall out of the allowable range or leaks occur to the pipeline.

4. The system of claim 1, wherein each of the sensors is selected from the group consisting of an infrared sensor, a data acquiring sensor, a microwave sensor, a flow meter, and a pressure sensor.

5. A computer-based method for detecting a pipeline, the method comprising:

reading pipeline data from a data collector, wherein the pipeline data comprises fluid temperatures, flow rates and fluid pressures;

analyzing the pipeline data to determine if the pipeline works abnormally;

analyzing the fluid temperatures to determine the fluid temperatures fall in an allowable range, and analyzing the flow rates to determine leak sections of the pipeline;

analyzing the fluid pressures of the leak sections to determine the leak positions in the leak sections;

identifying negative pressure waves generated in the leak sections according to the fluid pressures of the leak sections, and determining the leak positions in the leak sections according to the identified negative pressure waves;

sending an alert command to an alarm computer connected to the server to notify a user in response to a determination that the pipeline works abnormally, wherein the alarm computer sends an alert notification to the user; and saving the pipeline data into a database system.

6. The method of claim 5, wherein the pipeline data is acquired by sensors which is installed at different locations of a pipeline, and is collected by the data collector from the sensors.

7. The method of claim 5, wherein the pipeline works abnormally upon the condition that the fluid temperatures fall out of the allowable range or leaks occur to the pipeline.

8. The method of claim 5, wherein each of the sensors is selected from the group consisting of an infrared sensor, a data acquiring sensor, a microwave sensor, a flow meter, and a pressure sensor.

9. A non-transitory computer-readable medium having stored thereon instructions that, when executed by a computing device, causing the computing device to perform a method for detecting a pipeline, the method comprising:

reading pipeline data from a data collector, wherein the pipeline data comprises fluid temperatures, flow rates and fluid pressures;

analyzing the pipeline data to determine if the pipeline works abnormally;

analyzing the fluid temperatures to determine the fluid temperatures fall in an allowable range, and analyzing the flow rates to determine leak sections of the pipeline;

analyzing the fluid pressures of the leak sections to determine the leak positions in the leak sections;

identifying negative pressure waves generated in the leak sections according to the fluid pressures of the leak sections, and determining the leak positions in the leak sections according to the identified negative pressure waves;

sending an alert command to an alarm computer connected to the server to notify a user in response to a determination that the pipeline works abnormally, wherein the alarm computer sends an alert notification to the user; and saving the pipeline data into a database system.

10. The medium of claim 9, wherein the pipeline data is acquired by sensors which is installed at different locations of a pipeline, and is collected by the data collector from the sensors.

11. The medium of claim 9, wherein the pipeline works abnormally upon the condition that the fluid temperatures fall out of the allowable range or leaks occur to the pipeline.

12. The medium of claim 9, wherein each of the sensors is selected from the group consisting of an infrared sensor, a data acquiring sensor, a microwave sensor, a flow meter, and a pressure sensor.

* * * * *